Feb. 8, 1966   S. A. GRAY   3,233,623
MULTI-INPUT CONTROL MECHANISM FOR HYDRAULIC SERVO VALVE
Filed Dec. 4, 1962
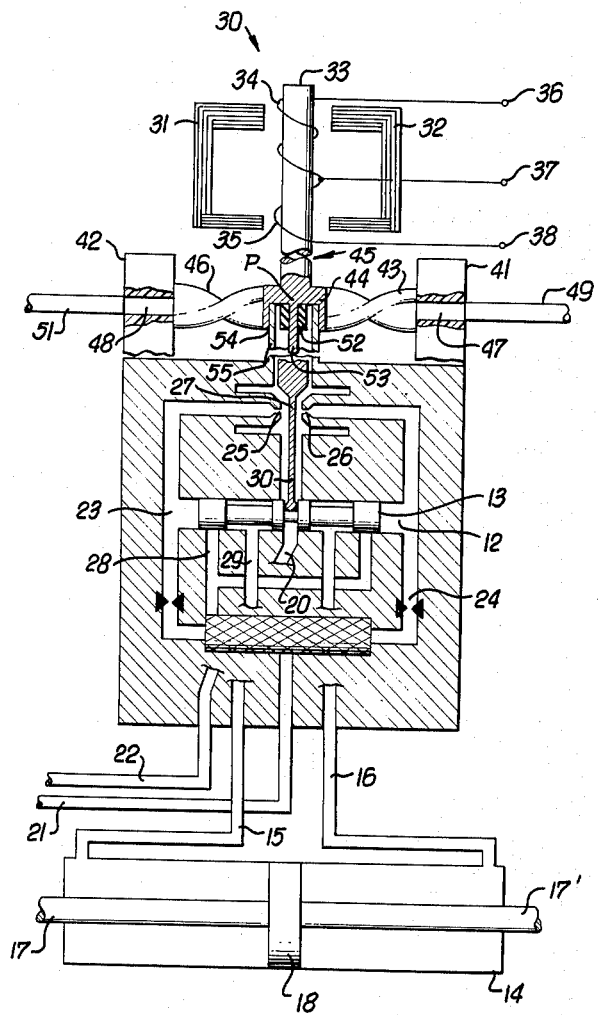
SAMUEL A. GRAY
INVENTOR.
BY
Nilsson & Robbins
ATTORNEYS 3,233,623
MULTI-INPUT CONTROL MECHANISM FOR
HYDRAULIC SERVO VALVE
Samuel A. Gray, North Hollywood, Calif., assignor to
Bell Aerospace Corporation, a corporation of Delaware
Filed Dec. 4, 1962, Ser. No. 242,301
13 Claims. (Cl. 137—85)

This invention relates generally to hydraulic valves, and more particularly to a hydraulic valve of the servo type which is responsive to a plurality of input signals. More specifically, this invention relates to a control mechanism for a hydraulic valve which mechanism is adapted for utilization of input signals in the form of command signals which are the result of the application of a fluid under pressure, or an electrical signal, or a combination of fluid under pressure and an electrical signal thereto.

The utilization of electrical or pressure signal information for application to a hydraulic valve as a command to the valve to supply power to a load has long been known in the prior art. Apparatus such as torque motors and Bourdon tubes have been used for converting the electrical or pressure signal information, respectively, into mechanical motion useful by the valve.

In utilizing Bourdon tubes to convert pressure input signal information to useful motion for a hydraulic servo type valve, it has been the prior art practice to connect the Bourdon tubes to a flapper assembly contained within the system at a point remote from the pivot point of the flapper assembly. Such a connection was deemed necessary since the assembly was suspended or retained upon the hydraulic valve by torsion bars, or the like, connected at the pivot point of the assembly. Although such apparatus did operate in accordance with the desired principles, it was found that the hydraulic valve was quite sensitive to high levels of vibration normally encountered under routine operational conditions therefore injecting undesired error signals into the system. By addition of the Bourdon tubes in the manner previously utilized in the prior art, it was also found that additional and undesirable spring rates, or forces, were introduced into the system. These added spring forces operated as added restraining forces that had to be overcome, thus reducing the sensitivity of the system. It was also discovered that the Bourdon tubes upon the application of fluid under pressure thereto, moved in a manner somewhat different from that required by the flapper assembly to effect operation of the servo valve, thus introducing undesirable losses into this system.

Accordingly, it is an object of the present invention to provide a hydraulic servo valve which is responsive to a plurality of input or command signals for supplying power to a load in accordance with the algebraic sum of said signals which valve is simple, inexpensive to manufacture and maintain, and overcomes the prior art disadvantages above referred to.

It is another object of the present invention to provide a hydraulic servo valve responsive to input or command signals which differ in kind, and yet which can be applied simultaneously to said valve.

It is another object of the present invention to provide a hydraulic servo valve which is responsive to both electrical and pressure command signals and which yields a high order of accuracy under adverse operating conditions, such as high temperature and vibration.

It is another object of the present invention to provide a hydraulic servo valve responsive to command signals initiated by a source of fluid under pressure applied to Bourdon tubes, which valve is substantially insensitive to vibration, temperature variation, introduces no unnecessary spring rates, and is adjustable to a high level of sensitivity.

Other objects and advantages of the present invention will become apparent from a consideration of the following description, taken in conjunction with the accompanying drawing, which is presented by the way of example only and is not intended as a limitation upon the scope of the present invention as defined in the appended claims, and in which:

The single figure is a schematic illustration of a hydraulic servo valve in accordance with the present invention.

A hydraulic servo valve in accordance with the present invention includes a housing having positioned therein a control valve for applying power to a load in response to a command signal. A control mechanism for the valve includes flapper assembly movable about a pivot point in response to the command signal for applying force to the control valve. The flapper assembly is suspended only at its pivot point by means sensitive to pressure variation. The pressure sensitive means moves upon application of pressure thereto and in response to such movement imparts force to the control valve commanding it to move. The assembly is also adaptable for actuation by an electrical signal which also functions as a command signal to the control valve.

In accordance with a more specific aspect of the present invention, the flapper assembly is suspended at its pivot point by a pair of twisted Bourdon tubes. The tubes are anchored at one end thereof and at the opposite ends thereof are connected to the flapper assembly at the pivot point thereof. The tubes are displaced 180° apart and are connected to a source of fluid under pressure. Rotation of the Bourdon tubes in response to variations of pressure in the source of fluid connected thereto impart rotary motion to the flapper assembly thus causing it to command application of power through the control valve to the load in response to pressure variations.

Referring now to the drawing, which is a schematic representation of a servo valve constructed in accordance with the present invention, there is illustrated a housing such as body 11 having a cylinder 12 formed therein within which there is disposed a control valve such as spool valve 13 which is movable longitudinally within the cylinder 12 in response to the application of pressure to either end thereof. The movement of the spool valve 13 to either side as viewed in the drawing applies power to a load actuating device 14 through the conduits 15 and 16 interconnected between the body 11 and the load actuating device 14. The load actuating device is interconnected to a load (not shown) by way of a connecting rod 17, 17' which is moved by the piston 18 connected thereto in response to the application of the fluid under pressure as above referred to.

An input conduit 21 is connected between a source of fluid under pressure (not shown) and the body 11 for applying said fluid to the valve. A return conduit 22 is also interconnected between the body 11 and a reservoir for said fluid (not shown).

The operation and construction of a hydraulic valve of the type illustrated in the drawing is fully described in Patent No. 2,947,286 issued August 2, 1962 to George T. Baltus and Martin P. Wolpin and entitled, "Integrated Actuator." Since the description and operation of a hydraulic valve as illustrated herein is fully accomplished in this patent, the hydraulic valve will only generally be described below.

The fluid under pressure from the source thereof is applied through the conduit 21 and into passageways 23 and 24 and passes, under quiescent operating conditions, through nozzles 25 and 26. Positioned intermediate the nozzles 25 and 26 is a flapper 27 which in its quiescent condition is spaced equidistant from the nozzles 25 and 26. Under these operating conditions, the spool valve 13 remains centered as illustrated within the cylinder 12, since the pressure applied to both sides thereof is equal and the fluid flows through return passageway 20 and conduit 22 to the return reservoir.

If the flapper 27 is displaced from its central position, as will be more fully discussed below, for example, toward the right as viewed in the drawing, the flow of fluid under pressure through nozzle 26 is restricted and through nozzle 25 is enhanced. As a result thereof a difference in pressure across the spool valve 13 is created such that there is an increase in pressure in the passageway 24 and a decrease in pressure in the passageway 23. The difference in pressure across the spool valve 13 thus causes it to move toward the left as viewed in the drawing. The movement toward the left causes pressure to be applied from the source of fluid under pressure through conduit 21, through a now open passageway 28, and into the cylinder 12. Since movement of the spool valve to the left has effectively interconnected the passageway 28 and a passageway 29, the fluid flows out through the passageway 29 and into the conduit 15 to the load actuating device 14. The movement of the spool valve 13 toward the left in addition to supplying power to the load actuating device 14, simultaneously tends to return the flapper 27 to its central position as a result of the interconnection therebetween by the leaf spring 30. It is thus seen that the power which is applied to the spool valve 13 is automatically fed back to the flapper 27, thus tending to always keep the flapper 27 in a neutral, or centered position. The spool valve 13 will not, however, fully return to its neutral position but will take some finite position displaced therefrom. The amount of displacement is determined by the forces applied to originally move the flapper 27 from its neutral position and the amount of feedback power applied by the spool valve 13.

It should thus be seen that the application of power to a load interconnected to the load actuating device is directly controlled through the movement of the flapper 27 to one position or the other, and to a greater or lesser degree. Movement of the flapper 27 may be initiated or controlled in a variety of ways. The present invention is particularly directed to the control mechanism which converts a command signal to movement of the flapper thus initiating the application of power to a load connected to the load actuating device 14.

Referring now more particularly to the upper portion of the drawing illustrating the present invention the mechanism for controlling the position of the flapper valve is illustrated. It should be noted that the central portion of the figure has been broken from the remainder of the body 11 described above and has been rotated 90°. This has been done to more clearly and accurately illustrate the present invention without undue complication as will become more apparent as the description below progresses.

As is well known in the prior art, an input signal can be applied to the flapper assembly electrically by means of a torque motor as is illustrated generally at 30. The torque motor 30 consists of a pair of pole pieces 31, 32 which are permanent magnets, and an armature 33 which forms the upper portion of the flapper assembly 45. Wound upon the armature 33 is a winding 34 which interconnects a pair of input terminals 36 and 37 and a winding 35 which interconnects the input terminals 37 and 38, 37 being a common terminal to the windings and to the input terminals 36 and 38. Upon the application of a signal of a predetermined polarity across the input terminals 36 and 37, the armature 33 is attracted to one of the pole pieces. Such movement causes the flapper 27 to move in the opposite direction. The movement can be viewed as a rotating of the flapper assembly 45 about the pivot point P thereof. Alternatively, the application of a potential of the opposite polarity across input terminals 37 and 38 causes the reverse procedure to occur, again causing the flapper 27 to move in response to the pivoting of the flapper assembly 45 about its pivot point P. In each case, upon the movement of the flapper 27, the operation of the hydraulic valve is as above outlined.

Input or command signals may also be applied to the valve in accordance with the present invention by the application of a source of fluid under pressure thereto. This is accomplished as illustrated in the 90° rotated central portion of the figure.

As is therein illustrated a pair of anchor posts 41 and 42 are provided preferably as an integral portion of the body 11 and positioned in diametrically opposed relationship thereon. Pressure sensitive means such as twisted Bourdon tube 43 is connected between anchor post 41 and a shoulder 44 provided upon the flapper assembly 45 at the pivot point P thereof. An additional pressure sensitive means such as twisted Bourdon tube 46 is connected between anchor post 42 and the shoulder 44 at the pivot point P of the flapper assembly 45. The Bourdon tubes are displaced 180° apart upon the shoulder 44. The anchor posts 41 and 42 define ports 47 and 48, respectively, therethrough which communicate with the hollow interior of the Bourdon tubes 43 and 46 respectively. A conduit 49 is connected between port 47 and a source of fluid under pressure (not shown) while a conduit 51 is connected between conduit 48 and a source of fluid under pressure (not shown). A sealing ring 52 is received around a reduced diameter portion 53 of the flapper assembly 45 positioned within a cuplike recess 54 defined by the shoulder 44 which in turn receives a cylinder 55 extending from body 11 thereby to seal the flapper assembly 45 to the body 11.

The Bourdon tubes 43 and 46 are each firmly and rigidly anchored at one end thereof to the respective anchor posts 41 and 42. Since the opposite end of the Bourdon tubes is connected to the flapper assembly 45 substantially at the pivot point thereof, the opposite ends are permitted to rotate as pressure is applied to the twisted Bourdon tubes and they expand. The rotation of the Bourdon tubes in turn applies a rotational movement to the flapper assembly 45 directly at the pivot point P thereof. This rotary moment in turn causes the flapper 27 to move closer to or further away from the nozzles 25 and 26 to apply power to the load actuating device 14 through the spool valve 13 as above described.

The rotation of the Bourdon tubes in actuating the flapper 27 cause it to move to the left or right as viewed in the drawing. It can, therefore, be seen that the Bourdon tubes are disposed orthogonally to the direction of motion and are in fact located in a position normal to the plane of the drawing. However, as was above pointed out, the central portion of the drawing has been broken away and rotated 90° for ease and clarity of illustration.

The twisted Bourdon tubes 43 and 46 are preferably connected substantially to the pivot point P of the flapper assembly 45 in such a manner that they rotate in opposition to each other. Such opposed rotation supplies only the difference between the rotational moments, or the difference of the pressures as applied through conduits 49 and 51, to the flapper 27. Alternatively, the twisted Bourdon tubes 43 and 46 may be connected in such a manner that they apply additive rotational forces imparted from the source of fluid under pressure by way of the conduits 49 and 51 to the flapper assembly 45 at its pivot point P. In either case the flapper valve 27 is caused to move, as above described, in response to the pressure command signal thus applied thereto.

One of the important features of the present invention is that the twisted Bourdon tubes 43 and 46 are connected to the flapper assembly 45 substantially at the pivot point P thereof. Such an interconnection provides several advantages for a valve constructed in accordance with the present invention. One of these advantages is that the entire flapper assembly 45 including the armature 33 and the flapper 27 can be mass-balanced; that is, the weight appearing on one side of the pivot point P can be made identical to the weight appearing on the opposite side of the pivot point P. This mass-balancing permits the flapper assembly 45 to be substantially insensitive to vibrations to which the valve may be subjected during normal operational characteristics of the device in which the valve is housed.

Another advantage gained by the construction in accordance with the present invention is that the Bourdon tubes 43 and 46 provide the only point of suspension for the flapper assembly 45. By being the only point of suspension, the spring force or rate to which the flapper assembly 45 is subjected is limited and the restraining forces which must be overcome to operate the valve constructed in accordance with the present invention is maintained at a minimum.

Since a finite and known minimum spring rate is present as a result of the use of the Bourdon tubes connected substantially at the pivot point P and being the only means of suspension for the flapper assembly 45, the entire valve can be gain compensated. That is, the permanent magnets 31, 32 which form a portion of the torque motor 30 can be adjusted to overcome the spring rate of the Bourdon tubes. Upon thus adjusting the permanent magnets 31 and 32 so that the spring rate of the Bourdon tubes can be overcome, a very slight application of force to the flapper assembly 45 by way of a command signal causes immediate movement of the flapper 27, thus applying a command signal to the hydraulic valve. It should become apparent that the coils 34 and 35 can be removed from the torque motor 30 leaving only the magnets 31, 32 and the armature 33. The servo valve could then be operated using only a source of fluid under pressure as the command signal. By proper adjustment of the magnets 31 and 32 a very sensitive servo valve is obtained.

Another advantage gained as a result of the construction in accordance with the present invention is the increased amplification which is realized as a result of applying the rotary moment of the twisted Bourdon tubes directly to the pivot point of the flapper assembly. It can be seen that as a result of this connection a slight rotation of the Bourdon tubes results in a relatively large movement of the flapper 27. If the Bourdon tubes are interconnected at any other point displaced from the pivot point, as has been customary in the prior art, the amplification of the motion imparted by the Bourdon tubes is reduced substantially or eliminated.

Although the above discussion and description of the device in accordance with the present invention have been given with respect to the application of a fluid under pressure to each of the Bourdon tubes 43 and 46, it should be expressly understood that similar results can be obtained by applying a source of fluid under pressure to only one of the Bourdon tubes 43 or 46. Under such operational circumstances an additional Bourdon tube is nonetheless utilized to complete the suspension of the flapper assembly 45 at the pivot point P thereof in accordance with the present invention. An additional twisted Bourdon tube is used for this suspension so that the valve in accordance with the present invention is temperature compensated; that is, the Bourdon tubes each expand a like amount but in opposite directions upon the application of elevated temperatures thereto. The expansion of each of the tubes unless properly compensated for could apply a command signal to the valve which would in fact be in error. Therefore, each of the Bourdon tubes is mounted in such a way that the expansion from temperature is opposed by the other Bourdon tube, and the tubes are each chosen to be of substantially the same identical material. In this manner, the valve is temperature compensated. This same principle is utilized during the time that a pressure command signal is applied to both or either of the twisted Bourdon tubes 43 or 46.

In operation a source of fluid under pressure can be applied only to input conduit 49 while blocking off conduit 51. Upon application of such pressure twisted Bourdon tube 43 expands, attempts to unwind, thus creating a rotational moment directed into the plane of the drawing as illustrated. Since the Bourdon tubes, in actual construction, are rotated 90°, and for purposes of description it will be assumed toward the left, it can be seen that the rotary movement is then clockwise. This rotary movement exactly matches the movement of the flapper assembly 45 about its pivot point P. Thus the flapper 27 is moved toward nozzle 25 which sets up a differential pressure across spool valve 13 causing it to move toward the right. Power is thus applied to the load actuator 14 through conduit 16 and simultaneously the spool valve 13 tends to return the flapper valve 27 toward its neutral or quiescent position until the force applied by the Bourdon tube is exactly balanced or stalled. A linear application of power is thus accomplished since the stall force of the Bourdon tube is a linear function even though its direct response to pressure application may not in all cases be a linear function.

If such is desired, a source of fluid under pressure may also be applied to the input conduit 51 which applies pressure to twisted Bourdon tube 46. Preferably the twisted Bourdon tubes are in phase opposition, as illustrated, so that the rotary motion of tube 43 is opposed by the rotary motion of tube 46. Under these conditions the difference in rotary motion is imparted to the pivot point P of the flapper assembly 45 and causes the flapper 27 to move. For example, if the pressure in tube 46 is greater than the pressure in tube 43, the flapper 27 moves closer to nozzle 26. Spool valve 13 then moves toward the left applying power to the load actuating device 14 through the conduit 15. Simultaneously the spool valve moves the flapper 27 toward its quiescent position until the resultant force (or differential) applied to the flapper assembly pivot point is balanced.

It should also be recognized that an electrical input signal may also be applied simultaneously to the torque motor 30 if such is desired. Under these operating conditions the resultant force determined by the algebraic sum of the forces applied by way of the twisted Bourdon tubes 43 and 46 and the torque motor 30 is applied to the pivot point P of the flapper assembly 45. This resultant force than moves the flapper 27 causing power application to the load as above described.

There has been disclosed a hydraulic servo valve having a control mechanism to which there can be applied one or a plurality of input or command signals which signals may be either as a result of the application of a fluid under pressure or of an electrical signal which mechanism is simple, rugged, inexpensive, and exceedingly sensitive only to desired command signals while being substantially insensitive to undesired error signals.

What is claimed is:

1. A hydraulic servo valve comprising: a body defining a cylinder, a pair of nozzles, and passageways communicating with said cylinder and nozzles; a power control valve movable within said cylinder and received thereby for applying power through said passageways to a load; a flapper assembly having a pivot point and being disposed partially within said body between said nozzles; and two twisted Bourdon tubes each of said tubes being rigidly affixed at one end thereof to said body and having the other end thereof connected to the pivot point of said flapper assembly thereby to suspend said flapper assembly, means for applying fluid under pressure through said body to at least one of said Bourdon tubes, said flapper assembly being movable about its pivot point in response to variations of pressure applied to said at least one of said Bourdon tubes thereby to vary the position thereof with respect to said nozzles to initiate movement of said power control valve, said Bourdon tubes being the only means of suspension for said flapper assembly.

2. A hydraulic servo valve as defined in claim 1 in which the weight of that portion of said flapper assembly disposed on each side of the pivot point thereof is substantially identical.

3. A hydraulic servo valve comprising: a body defining a cylinder, a pair of nozzles, and passageways communicating with said cylinder and nozzles; a power control valve movable within said cylinder and received thereby for applying power through said passageways to a load; a flapper assembly having a pivot point and being disposed partially within said body between said nozzles; and two twisted Bourdon tubes, each of said tubes being rigidly affixed at one end thereof to said body and having the other end thereof connected to the pivot point of said flapper assembly thereby to suspend said flapper assembly, said Bourdon tubes being displaced 180° from each other; means for applying fluid under pressure through said body to at least one of said Bourdon tubes; and permanent magnet means adjustably disposed adjacent said flapper assembly externally of said body for compensating the spring rate of said Bourdon tubes thereby to increase the sensitivity of said valve.

4. A hydraulic servo valve as defined in claim 3 in which at least a portion of said flapper assembly disposed externally of said body is an armature for a torque motor and said permanent magnet means is the pole pieces of said motor.

5. A hydraulic servo valve comprising: a body defining a cylinder, a pair of nozzles, and passageways communicating with said cylinder and nozzles; a power control valve movable within said cylinder and received thereby for applying power through said passageways to a load; a flapper assembly having a pivot point and being disposed partially within said body between said nozzles; a first twisted Bourdon tube connected between said body and said flapper assembly substantially at its pivot point and disposed to impart movement to said flapper assembly in one direction upon the application of a source of fluid under pressure thereto; and a second twisted Bourdon tube connected between said body and said flapper assembly substantially at its pivot point and displaced approximately 180° from said first Bourdon tube, said second Bourdon tube being disposed to impart movement to said flapper assembly in the opposite direction upon the application of a source of fluid under pressure thereto, said flapper assembly being movable about its pivot point in response to the difference between variations in pressure of the fluid applied to said Bourdon tubes thereby to vary the position thereof with respect to said nozzles, to initiate movement of said power control valve, said Bourdon tubes being the only means of suspension of said flapper assembly.

6. A hydraulic servo valve as defined in claim 5 further including a torque motor responsive to electrical signals for additionally varying the position of said flapper assembly, a portion of said flapper assembly external of said body being the armature of said torque motor.

7. A hydraulic servo valve in accordance with claim 5 in which one of said Bourdon tubes is reversed thereby imparting movement to said flapper assembly in response to the sum of the variations in pressure of the fluid applied to said Bourdon tubes.

8. A control mechanism for applying a command signal to a hydraulic servo valve including a body defining a cylinder, a pair of nozzles, and passageways communicating with said cylinder and nozzles, said control mechanism comprising: a flapper assembly for initiating movement of a power control valve to apply power to a load and having a pivot point; first means movable in response to fluid under pressure applied thereto connected to said assembly substantially at the pivot point thereof; second means movable in response to fluid under pressure applied thereto connected to said assembly substantially at the pivot point thereof and displaced 180° from said first means; said first and second means being the only suspension for said assembly, and said flapper assembly being responsive to the algebraic sum of the movements of said first and second means to initiate movement of said power control valve.

9. A control mechanism in accordance with claim 8 in which said first and second means are twisted Bourdon tubes.

10. A control mechanism in accordance with claim 9 further including conduit means communicating with the interior of at least one of said twisted Bourdon tubes for applying a source of fluid under pressure thereto.

11. A control mechanism in accordance with claim 10 further including a torque motor the armature of which is a portion of said flapper assembly.

12. A hydraulic servo valve comprising:
a body defining a cylinder, a pair of opposed nozzles, and passageways interconnecting said nozzles and said cylinder; a power control valve movably received within said cylinder for applying fluid under pressure to a load device; control means cooperating with said nozzles to move said power control valve, said control means including a flapper having one end disposed intermediate said nozzles, said flapper having a pivot point, pressure responsive means affixed at one end to said body and having the other end connected to said flapper at said pivot point thereof, said pressure responsive means being the only means of suspension for said flapper, the weight of said flapper on each side of said pivot point being substantially equal, and means for applying fluid under pressure to said pressure responsive means thereby to effect movement thereof.

13. A hydraulic servo valve as defined in claim 12 which further includes permanent magnet means positioned adjacent the opposite end of said flapper and adjusted to compensate the spring rate of said pressure responsive means.

References Cited by the Examiner
UNITED STATES PATENTS

| | | | |
|---|---|---|---|
| 2,835,265 | 5/1958 | Brandstadter | 137—82 |
| 2,890,411 | 6/1959 | Whittaker | 73—398 |
| 3,013,233 | 12/1961 | Bourns | 73—412 X |
| 3,078,863 | 2/1963 | Wolpin | 137—82 |

M. CARY NELSON, *Primary Examiner.*

W. F. O'DEA, *Examiner.*